US012255546B2

United States Patent
Ota et al.

(10) Patent No.: US 12,255,546 B2
(45) Date of Patent: Mar. 18, 2025

(54) POWER CONVERSION DEVICE THAT CONVERTS ELECTRIC POWER BETWEEN DC CIRCUIT AND AC CIRCUIT

(71) Applicant: Mitsubishi Electric Corporation, Tokyo (JP)

(72) Inventors: Katsuya Ota, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 17/772,686

(22) PCT Filed: Dec. 3, 2019

(86) PCT No.: PCT/JP2019/047263
§ 371 (c)(1),
(2) Date: Apr. 28, 2022

(87) PCT Pub. No.: WO2021/111526
PCT Pub. Date: Jun. 10, 2021

(65) Prior Publication Data
US 2022/0385209 A1   Dec. 1, 2022

(51) Int. Cl.
*H02M 7/537* (2006.01)
(52) U.S. Cl.
CPC .................... *H02M 7/537* (2013.01)
(58) Field of Classification Search
CPC ....... H02M 7/537; H02M 1/32; H02M 7/4835
See application file for complete search history.

(56) References Cited

U.S. PATENT DOCUMENTS 7,269,037 B2 *   9/2007   Marquardt .......... H02M 7/4835
                                              363/64
9,484,835 B2 *  11/2016   Norrga ................... H02M 7/483
(Continued)

FOREIGN PATENT DOCUMENTS

| EP | 3089344 A1 | 11/2016 |
| JP | 6207631 B2 | 10/2017 |
| WO | 2011012174 A1 | 2/2011 |

OTHER PUBLICATIONS

International Search Report (PCT/ISA/210) with English translation and Written Opinion (PCT/ISA/237) mailed on Feb. 4, 2020, by the Japan Patent Office as the International Searching Authority for International Application No. PCT/JP2019/047263.
(Continued)

*Primary Examiner* — Yusef A Ahmed
(74) *Attorney, Agent, or Firm* — BUCHANAN, INGERSOLL & ROONEY PC

(57) ABSTRACT

A power conversion device that converts electric power between a DC circuit and an AC circuit includes a leg circuit including a plurality of sub modules connected in series. A first sub module of the plurality of sub modules includes a first energy accumulation element, a first semiconductor circuit including two switching elements connected in series, and a second semiconductor circuit. The second semiconductor circuit includes a series circuit including a switching element and a semiconductor element connected in series, a second energy accumulation element connected in parallel to the series circuit, and an element including a resistive component connected in series to a parallel circuit including the series circuit and the second energy accumulation element.

16 Claims, 13 Drawing Sheets

(56) References Cited

U.S. PATENT DOCUMENTS

| | | | |
|---|---|---|---|
| 9,716,425 B2 | 7/2017 | Nami et al. | |
| 10,938,317 B2* | 3/2021 | Geske | H02M 7/5387 |
| 11,563,385 B2* | 1/2023 | Biris | H02M 7/4835 |
| 2012/0243282 A1* | 9/2012 | Marquardt | H02M 7/4835 363/132 |
| 2013/0063995 A1* | 3/2013 | Norrga | H02M 7/4835 363/125 |
| 2015/0124506 A1* | 5/2015 | Sahoo | H02P 27/14 363/126 |
| 2015/0349520 A1* | 12/2015 | Davidson | H02M 7/4835 361/57 |
| 2016/0013716 A1* | 1/2016 | Hur | H02M 7/4835 363/50 |
| 2016/0036314 A1* | 2/2016 | Koyanagi | H02M 7/483 363/65 |
| 2016/0141963 A1* | 5/2016 | Bakran | H02M 3/156 363/21.01 |
| 2016/0233758 A1* | 8/2016 | Eckel | H02M 7/4835 |
| 2016/0308373 A1* | 10/2016 | Geske | H02M 7/483 |
| 2016/0308458 A1 | 10/2016 | Jimichi et al. | |
| 2016/0336751 A1* | 11/2016 | Hu | H02J 3/36 |
| 2017/0070047 A1* | 3/2017 | Shen | H02M 7/4835 |
| 2017/0358999 A1* | 12/2017 | Geske | H02M 1/32 |
| 2018/0034362 A1* | 2/2018 | Kubouchi | H02M 1/32 |
| 2018/0069478 A1* | 3/2018 | Phadke | H02M 3/33507 |
| 2018/0076734 A1* | 3/2018 | Jimichi | H02M 7/003 |
| 2018/0159422 A1* | 6/2018 | Kikuchi | H02M 7/12 |
| 2018/0166973 A1* | 6/2018 | Luerkens | H02M 3/156 |
| 2018/0183231 A1* | 6/2018 | Xie | H02H 7/12 |
| 2019/0028021 A1* | 1/2019 | Chivite-Zabalza | H02J 7/345 |
| 2019/0064249 A1* | 2/2019 | Yoshida | G01R 31/2608 |
| 2019/0068076 A1* | 2/2019 | Uda | H02M 7/483 |
| 2019/0157968 A1* | 5/2019 | Tsuchiya | H02M 7/12 |
| 2019/0173392 A1* | 6/2019 | Li | H02M 7/4835 |
| 2019/0386578 A1* | 12/2019 | Kajiyama | H02H 7/1216 |
| 2020/0177097 A1* | 6/2020 | Takahashi | H02M 7/5387 |
| 2020/0366186 A1* | 11/2020 | Hur | H02M 1/32 |
| 2021/0091661 A1* | 3/2021 | Kono | H02M 7/4835 |
| 2022/0247306 A1* | 8/2022 | Zhang | H02M 1/32 |
| 2022/0352810 A1* | 11/2022 | Lee | H02M 7/4835 |

OTHER PUBLICATIONS

Extended European Search Report issued in corresponding European Patent Application No. 19955250.6, mailed on Oct. 21, 2022, 7 Pages.

Communication pursuant to Article 94(3) EPC dated May 6, 2024, issued in the corresponding European Patent Application No. 19955250.6, 8 pages.

* cited by examiner

FIG.8
(a)
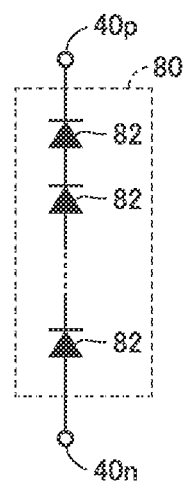
(b)
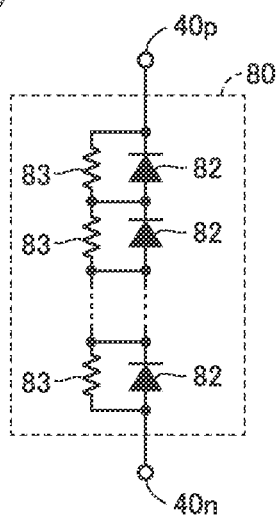

FIG.13
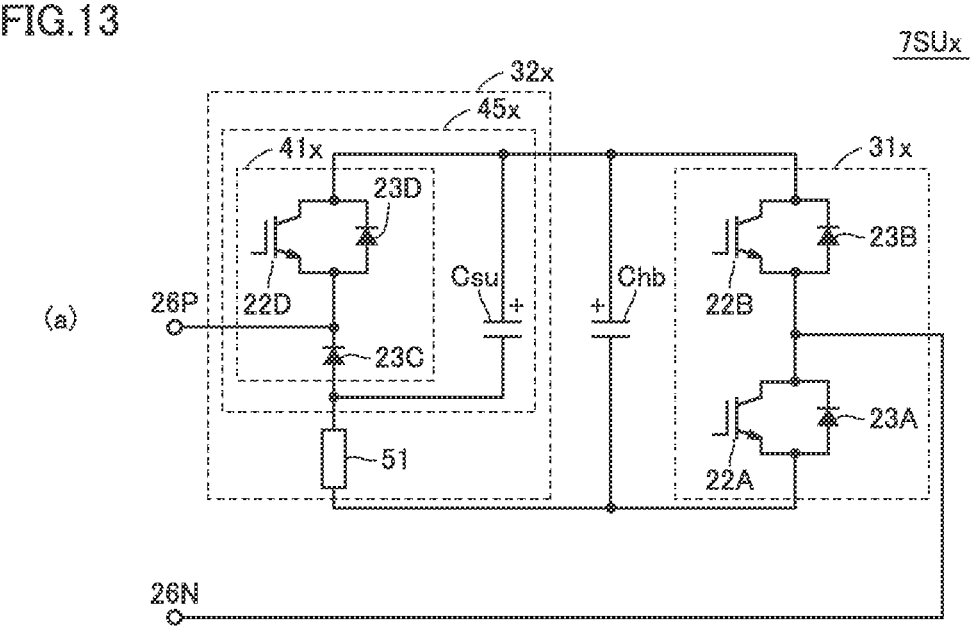
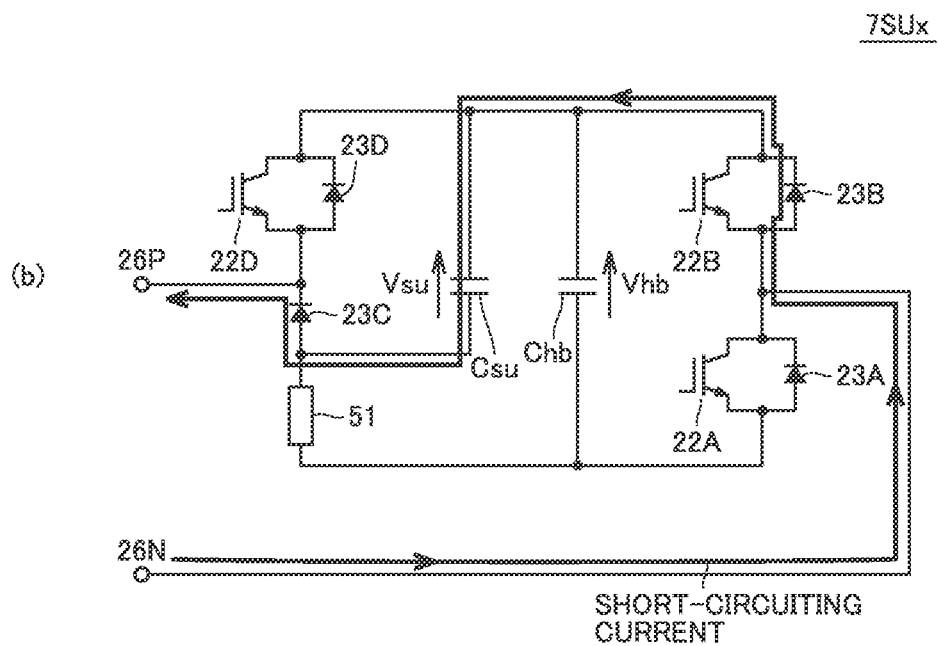
SHORT-CIRCUITING CURRENT

POWER CONVERSION DEVICE THAT CONVERTS ELECTRIC POWER BETWEEN DC CIRCUIT AND AC CIRCUIT

TECHNICAL FIELD

The present disclosure relates to a power conversion device.

BACKGROUND ART

A modular multilevel converter (MMC) has been known as a self-excited power conversion device included in a direct-current (DC) power transmission system. The modular multilevel converter includes an upper arm connected to a positive DC terminal and a lower arm connected to a low-potential-side DC terminal for each phase of an alternating current (AC). Each arm is constituted of a plurality of cascade-connected sub modules. The "sub module" is also referred to as a "converter cell."

U.S. Pat. No. 9,716,425 (PTL 1) discloses a power conversion device for suppressing a short-circuiting current in the event of a DC short-circuiting fault without a sub module being configured in a full-bridge topology of semiconductor switching elements.

CITATION LIST

Patent Literature

PTL 1: U.S. Pat. No. 9,716,425

SUMMARY OF INVENTION

Technical Problem

PTL 1 discloses a sub module composed of a first unit including two switching elements connected in series, an energy accumulation element, and a second unit including a diode and one switching element connected in series. With this sub module, it is aimed to suppress a short-circuiting current in the event of a DC short-circuiting fault and to protect an element in the sub module while the number of components is reduced by including a diode in the second unit as compared with a sub module configured in a full-bridge topology.

In PTL 1, however, the energy accumulation element for power conversion also serves to suppress the short-circuiting current. Therefore, the energy accumulation element that meets requirements for both of power conversion and suppression of the short-circuiting current should be selected, and a degree of freedom in design of the energy accumulation element is restricted.

An object in one aspect of the present disclosure is to provide a power conversion device capable of more readily preventing break of an element included in a sub module in the event of short-circuiting in a DC circuit.

Solution to Problem

A power conversion device according to one embodiment converts electric power between a DC circuit and an AC circuit. The power conversion device includes a leg circuit including a plurality of sub modules connected in series. At least one of the plurality of sub modules is a first sub module. The first sub module includes a first energy accumulation element, a first semiconductor circuit including two switching elements connected in series, and a second semiconductor circuit. The first energy accumulation element, the first semiconductor circuit, and the second semiconductor circuit are connected in parallel to one another. The second semiconductor circuit includes a series circuit including a switching element and a semiconductor element connected in series, a second energy accumulation element connected in parallel to the series circuit, and an element including a resistive component connected in series to a parallel circuit including the series circuit and the second energy accumulation element.

Advantageous Effects of Invention

According to the present disclosure, in the event of short-circuiting in the DC circuit, break of the element included in the sub module can more readily be prevented.

BRIEF DESCRIPTION OF DRAWINGS

FIG. 8 is a circuit diagram showing an exemplary configuration of a bypass circuit according to the second embodiment.

FIG. 13 is a diagram showing another exemplary circuit configuration of a sub module with a function to suppress a short-circuiting fault current.

DESCRIPTION OF EMBODIMENTS

Figure 1:
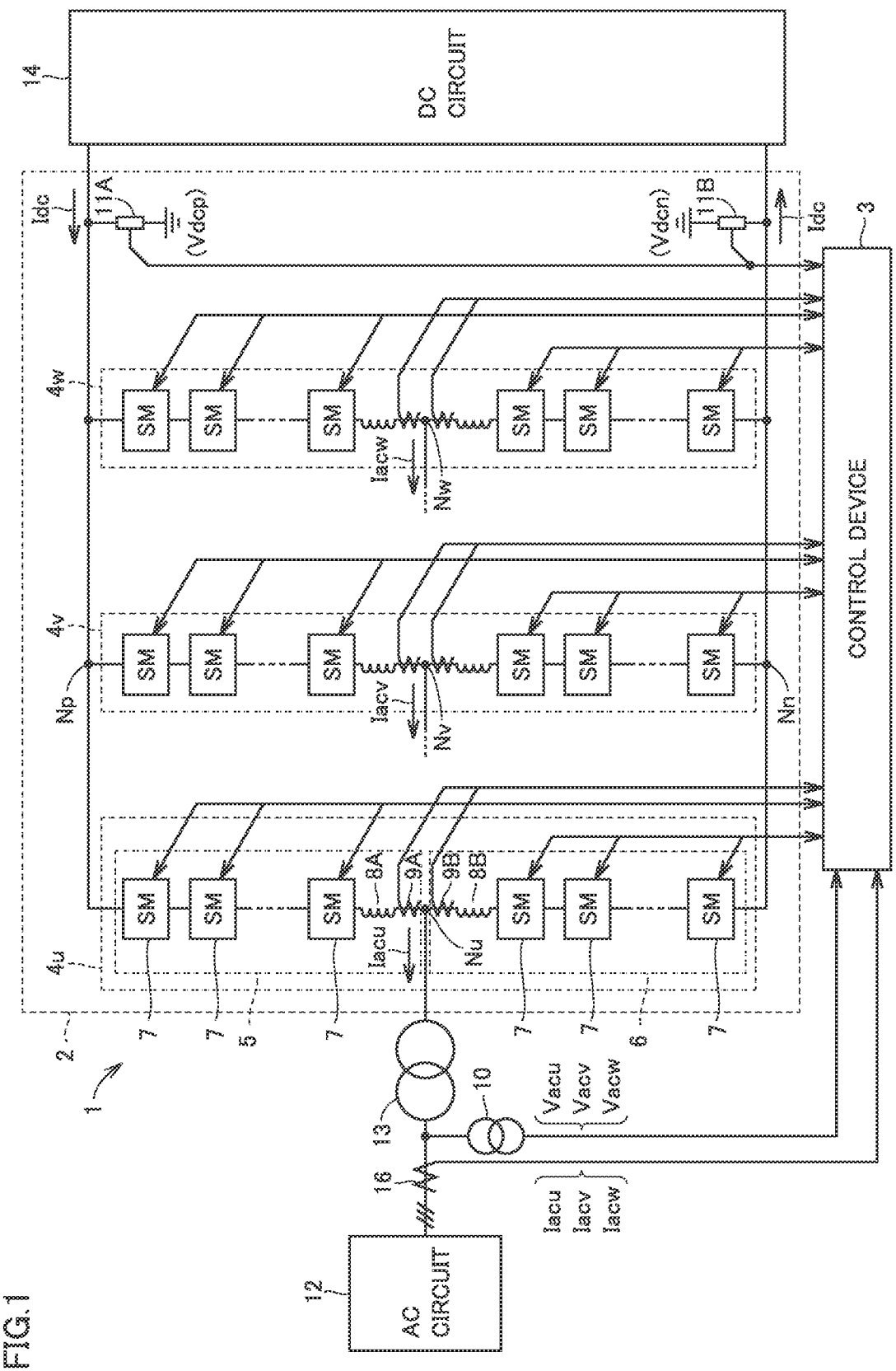
FIG. 1 is a schematic configuration diagram of a power conversion device.

An embodiment of the present disclosure will be described below with reference to the drawings. In the description below, the same elements have the same reference characters allotted and their labels and functions are also the same. Therefore, detailed description thereof will not be repeated.

First Embodiment

<Overall Configuration of Power Conversion Device>

FIG. 1 is a schematic configuration diagram of a power conversion device 1. Referring to FIG. 1, power conversion device 1 is configured of a modular multilevel converter which includes multiple sub modules (corresponding to "SM" in FIG. 1) 7 connected in series. Power conversion device 1 converts power between a DC circuit 14 and an AC circuit 12. Power conversion device 1 includes a power converter 2 and a control device 3.

Power converter 2 includes multiple leg circuits 4u, 4v, 4w (will be described as a "leg circuit 4" when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between AC circuit 12 and DC circuit 14, and converts power between the circuits. AC circuit 12 shown in FIG. 1 is a three-phase AC circuit which includes three leg circuits 4u, 4v, 4w corresponding to a U phase, a V phase, and a W phase, respectively.

AC terminals Nu, Nv, Nw provided for respective leg circuits 4u, 4v, 4w are connected to AC circuit 12 via a transformer 13. AC circuit 12 is, for example, an AC system which includes an AC power supply, etc. For ease of illustration, FIG. 1 does not show connection between AC terminals Nv, Nw and transformer 13.

Positive DC terminal Np and negative DC terminal Nn, which are connected in common to each leg circuit 4, are connected to DC circuit 14. DC circuit 14 is, for example, a DC power system, including a DC power grid, or a DC terminal of other power conversion devices.

AC input terminals Nu, Nv, Nw may be connected to AC circuit 12 via an interconnection reactor, instead of transformer 13 in FIG. 1. Furthermore, instead of AC terminals Nu, Nv, Nw, a primary winding may be provided for each of leg circuits 4u, 4v, 4w, and leg circuits 4u, 4v, 4w may be connected to transformer 13 or an interconnection reactor in an AC manner via a secondary winding magnetically coupled to the primary winding. In this case, the primary winding may be reactors 8A, 8B described below. In other words, leg circuit 4 is electrically (i.e., a DC manner or an AC manner) connected to AC circuit 12 via an AC connector provided for each of leg circuits 4u, 4v, 4w, such as AC terminals Nu, Nv, Nw or the above primary winding.

Leg circuit 4u includes an upper arm 5 provided between the AC connector (for example, AC terminal Nu) connected to AC circuit 12 and positive DC terminal Np connected to DC circuit 14 and a lower arm 6 provided between the AC connector and negative DC terminal Nn connected to DC circuit 14. AC terminal Nu, which is the point of connection between upper arm 5 and lower arm 6, is connected to transformer 13. Positive DC terminal Np and negative DC terminal Nn are connected to DC circuit 14. Leg circuits 4v, 4w have the same configuration as leg circuit 4u, and leg circuit 4u will thus be representatively described below. When upper arm 5 and lower arm 6 are not distinguished from each other, they are also simply referred to as an "arm".

Upper arm 5 includes multiple cascade-connected sub modules 7 and reactor 8A. In upper arm 5, multiple sub modules 7 and reactor 8A are connected in series. Similarly, lower arm 6 includes multiple cascade-connected sub modules 7 and reactor 8B. In lower arm 6, multiple sub modules 7 and reactor 8B are connected in series.

Reactor 8A may be inserted anywhere in upper arm 5 of leg circuit 4u. Reactor 8B may be inserted anywhere in lower arm 6 of leg circuit 4u. Multiple reactors 8A and multiple reactors 8B may be present. The reactors may have different inductance values. Only reactor 8A of upper arm 5 may be provided, or only reactor 8B of lower arm 6 may be provided. Reactors 8A, 8B are provided to suppress a circulating current and to prevent a rapid increase of a fault current in the event of a fault of AC circuit 12 or DC circuit 14.

As detectors for measuring the electrical quantities (for example, current, voltage, etc.) for use in the control, power conversion device 1 includes an AC voltage detector 10, an AC current detector 16, DC voltage detectors 11A, 11B, and arm current detectors 9A, 9B. Arm current detectors 9A, 9B are provided for each leg circuit 4. Signals detected by these detectors are input to control device 3.

Control device 3 provides an operation command for controlling an operating state of each sub module 7 based on these detection signals. The operation command is generated in correspondence with each of the upper arm of the U phase, the lower arm of the U phase, the upper arm of the V phase, the lower arm of the V phase, the upper arm of the W phase, and the lower arm of the W phase. Control device 3 receives various types of information from each sub module 7. The various types of information are internal information of sub module 7, and includes a voltage value of a capacitor in sub module 7 and state information representing a state of sub module 7.

Control device 3 typically includes an auxiliary transformer, an analog to digital (AD) conversion unit, an arithmetic processing unit, and the like as a hardware configuration. The arithmetic processing unit includes a central processing unit (CPU), a random access memory (RAM), and a read only memory (ROM). The AD conversion unit includes an analog filter, a sample-and-hold circuit, a multiplexer, and the like. Control device 3 may be implemented, for example, by a digital protection control device.

Note that, for ease of illustration, in FIG. 1, some of signal lines for the signals input from the detectors to control device 3 and signal lines for the signals input/output to/from control device 3 and each sub module 7 are depicted collectively, but they are, in practice, provided for each detector and each sub module 7. The signal lines may be provided separately for transmission and reception of the signals between each sub module 7 and control device 3. For example, an optical fiber may be adopted as the signal line.

In the following, each detector is described in detail.

AC voltage detector 10 detects a U-phase AC voltage Vacu, a V-phase AC voltage Vacv, and a W-phase AC voltage Vacw of AC circuit 12. AC current detector 16 detects a U-phase AC current Iacu, a V-phase AC current Iacv, and a W-phase AC current Iacw of AC circuit 12. DC voltage detector 11A detects a DC voltage Vdcp of positive DC terminal Np connected to DC circuit 14. DC voltage detector 11B detects a DC voltage Vdcn of negative DC terminal Nn connected to DC circuit 14.

Arm current detectors 9A and 9B, included in leg circuit 4u for U phase, respectively detect an upper arm current Ipu flowing through upper arm 5 and a lower arm current Inu flowing through lower arm 6. Arm current detectors 9A and 9B, included in leg circuit 4v for V phase, detect an upper arm current Ipv and a lower arm current Inv, respectively. Arm current detectors 9A and 9B, included in leg circuit 4w for W phase, detect an upper arm current Ipw and a lower arm current Inw, respectively. In the description below, upper arm currents Ipu, Ipv, and Ipw are collectively denoted as an upper arm current Iarmp, lower arm currents Inu, Inv, and Inw are collectively denoted as a lower arm current Iarmn, and upper arm current Iarmp and lower arm current Iarmn are collectively denoted as an arm current Iarm.

<Configuration of Sub Module>

Figure 2:
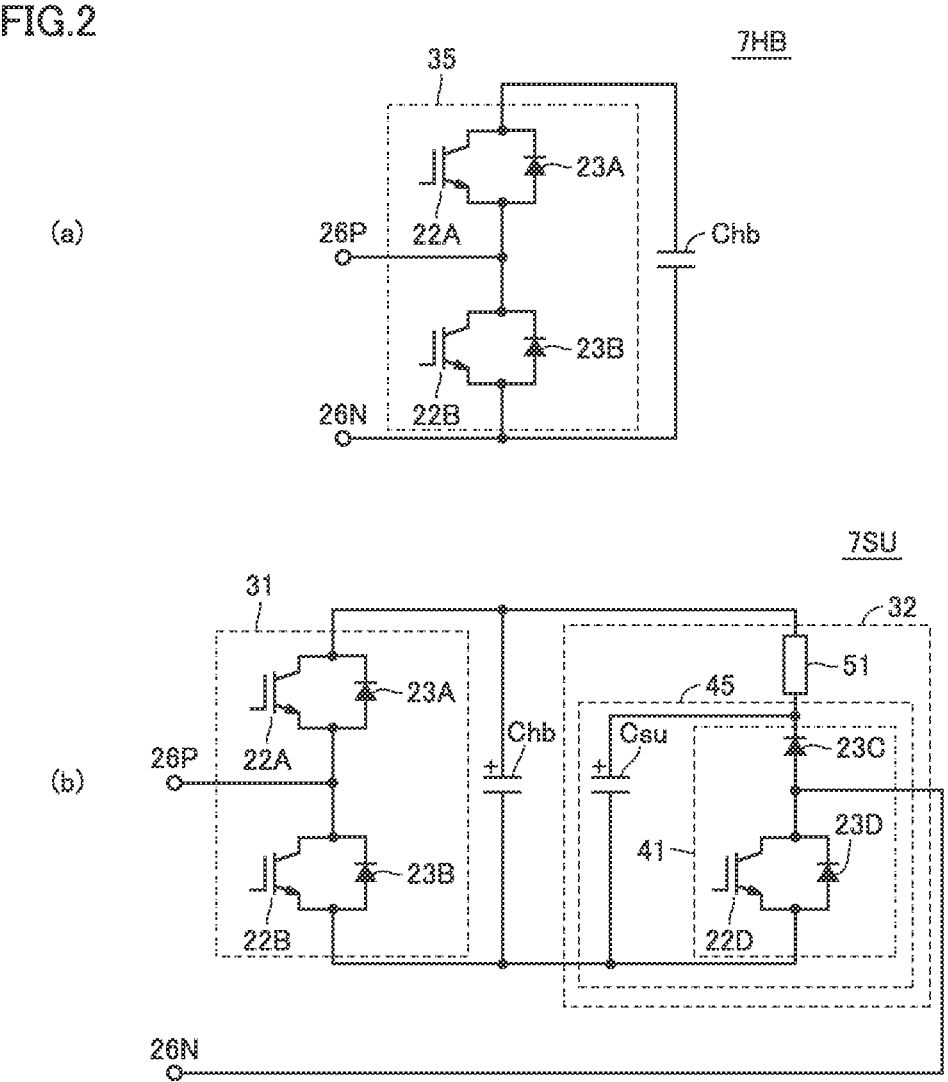
FIG. 2 is a circuit diagram showing an exemplary sub module included in each leg circuit in FIG. 1.

FIG. 2 is a circuit diagram showing an exemplary sub module included in each leg circuit in FIG. 1. Specifically, sub module 7 shown in FIG. 2(a) has a circuit configuration called a half-bridge configuration. "Sub module 7" in the circuit configuration in FIG. 2(a) is also referred to as a "sub module 7HB" below.

Sub module 7HB includes a semiconductor circuit 35 and a capacitor Chb which is an energy accumulation element. Semiconductor circuit 35 includes two switching elements 22A and 22B connected in series and diodes 23A and 23B. Diodes 23A and 23B are diodes connected in anti-parallel (that is, in parallel and in a reverse bias direction) to respective switching elements 22A and 22B. Capacitor Chb is connected in parallel to semiconductor circuit 35 and holds a DC voltage.

Opposing terminals of switching element 22B are referred to as input/output terminals 26P and 26N. Specifically, a node of connection between switching elements 22A and 22B is connected to input/output terminal 26P on the high potential side. A node of connection between switching element 22B and capacitor Chb is connected to input/output terminal 26N on the low potential side. Typically, input/output terminal 26P is connected to input/output terminal 26N of sub module 7 adjacent on the positive side. Input/output terminal 26N is connected to input/output terminal 26P of sub module 7 adjacent on the negative side.

As a result of switching operations by switching elements 22A and 22B, a voltage across ends of capacitor Chb and a zero voltage are provided between the input/output terminals of sub module 7HB. For example, when switching element 22A is turned on and switching element 22B is turned off, the voltage across ends of capacitor Chb is provided. When switching element 22A is turned off and switching element 22B is turned on, the zero voltage is provided.

Sub module 7 shown in FIG. 2(b) is different in circuit configuration from the circuit shown in FIG. 2(a) in additionally including another circuit. "Sub module 7" in the circuit configuration shown in FIG. 2(b) is also referred to as a "sub module 7SU" below.

Sub module 7SU includes a semiconductor circuit 31, capacitor Chb, and a semiconductor circuit 32. Semiconductor circuit 31, capacitor Chb, and semiconductor circuit 32 are connected in parallel to one another. Semiconductor circuit 31 is identical to semiconductor circuit 35 in FIG. 2(a). Therefore, sub module 7SU substantially has such a circuit configuration that semiconductor circuit 32 is added to sub module 7HB.

Semiconductor circuit 32 includes a series circuit 41, a capacitor Csu, and a resistance element 51. Series circuit 41 includes a switching element 22D and a diode 23C connected in series, diode 23C being a semiconductor element through which a short-circuiting current flows in the event of a short-circuiting fault in DC circuit 14. Capacitor Csu is an energy accumulation element connected in parallel to series circuit 41. Resistance element 51 is connected in series to a parallel circuit 45 including series circuit 41 and capacitor Csu. A diode 23D is a diode connected in anti-parallel to switching element 22D. Though details will be described later, semiconductor circuit 32 performs a function to suppress a fault current that flows on the occurrence of a short-circuiting fault in DC circuit 14.

The node of connection between switching elements 22A and 22B is connected to input/output terminal 26P on the high-potential side, and a node of connection between switching element 22D and diode 23C is connected to input/output terminal 26N on the low-potential side.

During a normal power conversion operation, switching element 22D is always on, and a voltage across ends of capacitor Chb and the zero voltage are provided between the input/output terminals of sub module 7SU as a result of switching operations by switching elements 22A and 22B. For example, when switching element 22A is turned on and switching element 22B is turned off, the voltage across ends of capacitor Chb is provided. When switching element 22A is turned off and switching element 22B is turned on, the zero voltage is provided.

A self-arc-extinguishing switching element, an on operation and an off operation of which are both controllable, is employed for each of switching elements 22A, 22B, and 22D in FIGS. 2(a) and (b). Switching elements 22A, 22B, and 22D are each, for example, a self-arc-extinguishing semiconductor switching element such as an insulated gate bipolar transistor (IGBT), a gate commutated turn-off (GCT) thyristor, or a metal oxide semiconductor field-effect transistor (MOSFET).

In FIGS. 2(a) and (b), a capacitor such as a metal evaporated film capacitor is mainly employed for capacitors Chb and Csu. In the description below, a voltage across ends of capacitor Chb is also referred to as a voltage Vhb and a voltage across ends of capacitor Csu is also referred to as a voltage Vsu.

<Current Path in the Event of Short-Circuiting Fault in DC Circuit>

In the first embodiment, a defined number of sub modules among the plurality of sub modules 7 are implemented by sub modules 7SU with a function to suppress a short-circuiting fault current, and remaining sub modules 7 are implemented by sub modules 7HB. A short-circuiting current in the event of a short-circuiting fault in DC circuit 14 is thus suppressed. For comparison with the first embodiment, initially, a path of a short-circuiting current in a comparative example in which all of the plurality of sub modules 7 are implemented by sub modules 7HB will be described.

Figure 3:
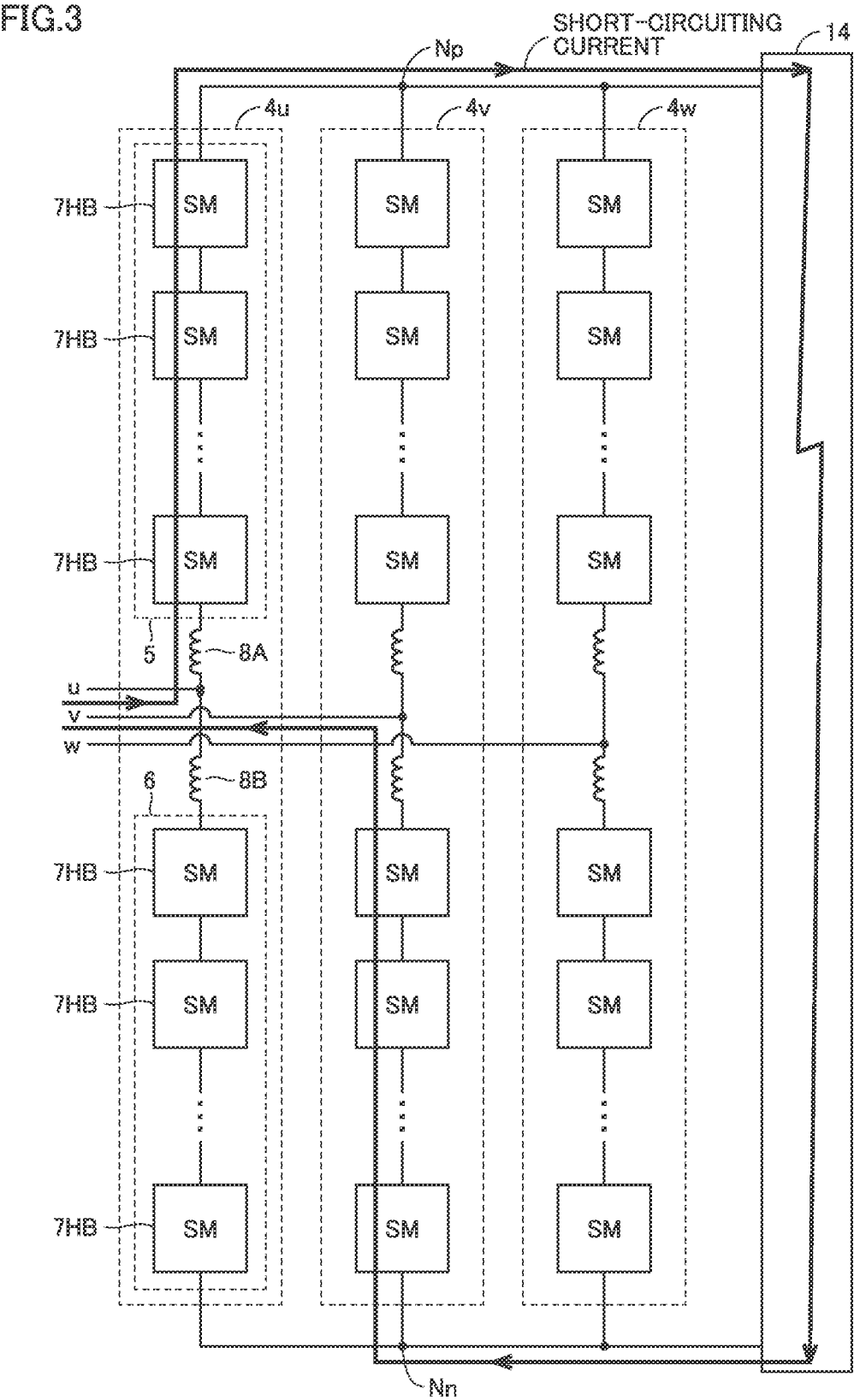
FIG. 3 is a diagram showing a path of a short-circuiting current in a comparative example.

FIG. 3 is a diagram showing a path of a short-circuiting current in the comparative example. Referring to FIG. 3, a short-circuiting current that flows through the inside of DC circuit 14 from the high-potential side toward the low-potential side flows through the inside of the power conversion device in a direction from negative DC terminal Nn toward positive DC terminal Np. In which of upper arm 5 and lower arm 6 in each of leg circuits 4u, 4v, and 4w the short-circuiting current flows is different depending on a phase of an AC current that flows between AC circuit 12 and the power conversion device. In the case of FIG. 3, the short-circuiting current flows from negative DC terminal Nn through lower arm 6 of the V phase to AC circuit 12, and the short-circuiting current flows in a direction from AC circuit 12 through upper arm 5 of the U phase toward positive DC terminal Np.

The control device of the power conversion device directly or indirectly detects a current that flows through each switching element. Typically, when the control device determines that short-circuiting has occurred based on the detected arm current, it turns off each switching element within the power conversion device. In a half-bridge configuration as in sub module 7HB, however, even when each switching element is turned off as shown in FIG. 2(a), the path of the short-circuiting current in the direction from input/output terminal 26N toward input/output terminal 26P is maintained and an excessive short-circuiting current flows because a diode (that is, diode 23B) connected in anti-parallel is present.

A configuration including sub module 7SU will now be described.

Figure 4:
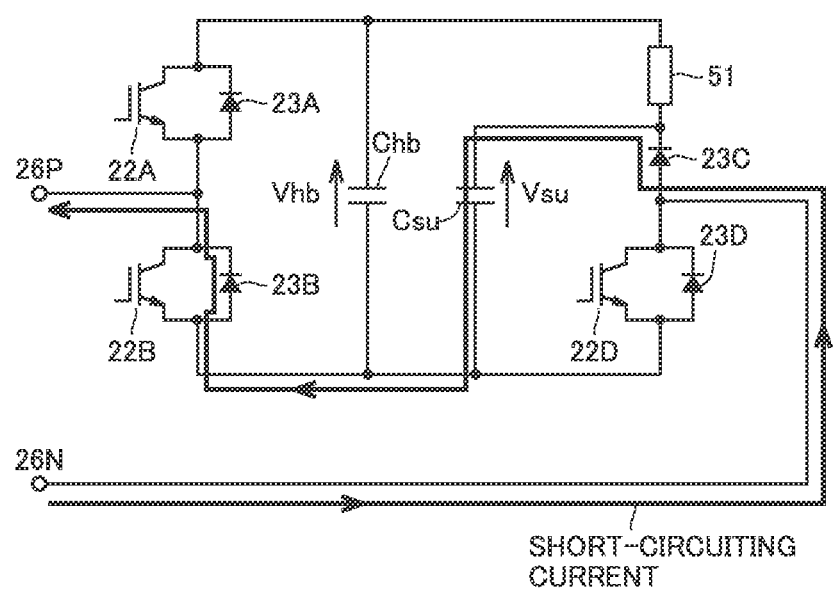
FIG. 4 is a diagram showing a path of a short-circuiting current within the sub module according to a first embodiment.

FIG. 4 is a diagram showing a path of a short-circuiting current within sub module 7SU according to the first embodiment. It is assumed that voltage Vhb of capacitor Chb is substantially equal to voltage Vsu of capacitor Csu.

Referring to FIG. 4, for example, when control device 3 determines that a short-circuiting fault has occurred in DC circuit 14 based on detected arm current Iarm, it turns off switching elements 22A, 22B, and 22D. Thus, as shown in FIG. 4, the short-circuiting current flows through a path from input/output terminal 26N through diode 23C, capacitor Csu, and diode 23B to input/output terminal 26P.

In this case, since diodes 23B and 23C are not conducting unless a voltage across input/output terminals 26P and 26N of sub module 7SU is higher than voltage Vsu, the short-circuiting current does not flow. In other words, when the voltage across input/output terminals 26P and 26N is equal to or lower than voltage Vsu, the short-circuiting current can be suppressed. Since input/output terminals 26P and 26N are connected in series, generally, the short-circuiting current can be suppressed so long as the voltage (for example, an AC grid voltage) of AC circuit 12 is equal to or lower than the total of voltages Vsu of capacitors Csu present on the path of the short-circuiting current. Even though the short-circuiting current temporarily flows, capacitor Csu is charged and voltage Vsu is further increased, which contributes to reduction in short-circuiting current and finally to suppression of the short-circuiting current.

Diode 23C above performs a function to prevent flow of a current through resistance element 51 during normal control (that is, when the zero voltage or voltage Vhb is provided across input/output terminals 26P and 26N) and to cause the short-circuiting current shown in FIG. 4 to flow toward capacitor Csu. Therefore, another semiconductor element that performs a similar function may be employed instead of diode 23C.

Resistance element 51 plays a role to isolate capacitor Chb and capacitor Csu from each other such that a positive side of capacitor Chb and a positive side of capacitor Csu are not at the same potential in a short time domain. Therefore, another element with a resistance component that plays a similar role may be employed instead of resistance element 51. For example, resistance element 51 can be substituted with a reactor or a diode. In this case, the diode has an anode provided on the positive side of capacitor Chb and a cathode provided on a side of diode 23C.

Figure 5:
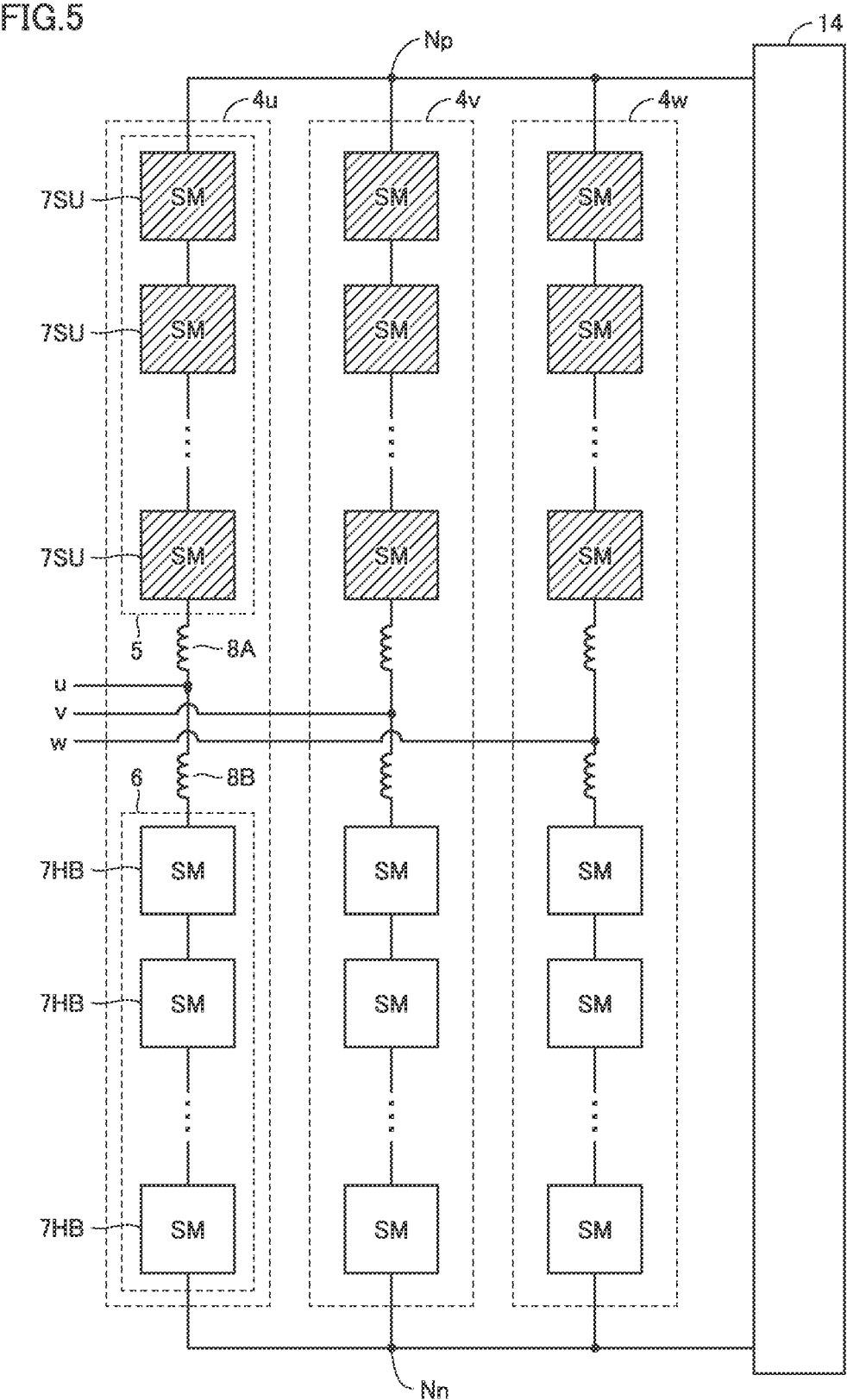
FIG. 5 is a diagram showing a configuration of a leg circuit according to the first embodiment.

FIG. 5 is a diagram showing a configuration of a leg circuit according to the first embodiment. Referring to FIG. 5, each sub module 7 included in upper arm 5 of each leg circuit 4 is implemented by sub module 7SU and each sub module 7 included in lower arm 6 is implemented by sub module 7HB.

As described above, when a maximum voltage of AC circuit 12 is equal to or lower than the total of voltages Vsu, the short-circuiting current that flows in the direction from input/output terminal 26N toward input/output terminal 26P can be suppressed. An AC voltage that tends to cause the short-circuiting current to flow in the direction from input/output terminal 26P toward input/output terminal 26 is blocked by voltage Vhb. When N sub modules 7 in total are included in leg circuit 4, a maximum value of the voltage of AC circuit 12 substantially corresponds to the sum of voltages Vhb of N/2 sub modules 7. Voltage Vhb and voltage Vsu are equal to each other. Therefore, by preparing at least N/2 sub modules 7SU that provide voltages Vsu, the voltage of AC circuit 12 is equal to or lower than the total of voltages Vsu and hence the short-circuiting current can be suppressed.

Typically, upper arm 5 and lower arm 6 are equal to each other in number of sub modules. Therefore, for example, by implementing all sub modules 7 in upper arm 5 with sub modules 7SU as shown in FIG. 5, the short-circuiting current can be suppressed.

More specifically, in order to suppress the short-circuiting current, sub modules 7SU in number larger than the number calculated by dividing the maximum value of the voltage of AC circuit 12 by voltage Vsu of capacitor Csu (that is, the number of sub modules calculated as "maximum value of voltage of AC circuit"÷"voltage Vsu") should only be provided in the path of the short-circuiting current. The resultant number calculated by this division is also referred to as a "calculated number K" below. Leg circuit 4 should only include calculated number K of sub modules 7SU, and any ratio between the number of sub modules 7SU included in upper arm 5 and the number of sub modules 7SU included in lower arm 6 may be set.

The first embodiment is configured such that sub modules 7SU in number necessary for protection against a short-circuiting fault in DC circuit 14 are provided, and other than these sub modules, sub module 7HB in the half-bridge configuration is provided. An overcurrent caused by short-circuiting in DC circuit 14 can thus be suppressed. Sub module 7SU independently includes capacitor Chb for power conversion and capacitor Csu for suppression of the short-circuiting current. Therefore, capacitor Chb suitable for power conversion and capacitor Csu suitable for suppression of the short-circuiting current can individually be designed and a degree of freedom in design is improved. Therefore, the short-circuiting current in DC circuit 14 can more readily be suppressed.

In the first embodiment, the number of sub modules 7SU can be suppressed to a minimum necessary number by calculating calculated number K, and hence the configuration can also be simplified. By employing capacitor Csu lower in capacity (lower in capacity than capacitor Chb), voltage Vsu can be higher. Therefore, in this case, the number of sub modules 7SU necessary for protection against a short-circuiting fault in DC circuit 14 can be reduced. From a point of view of suppression of the short-circuiting current, for example, all sub modules 7 within leg circuit 4 may be implemented by sub modules 7SU.

<Processing Procedure>

Figure 6:
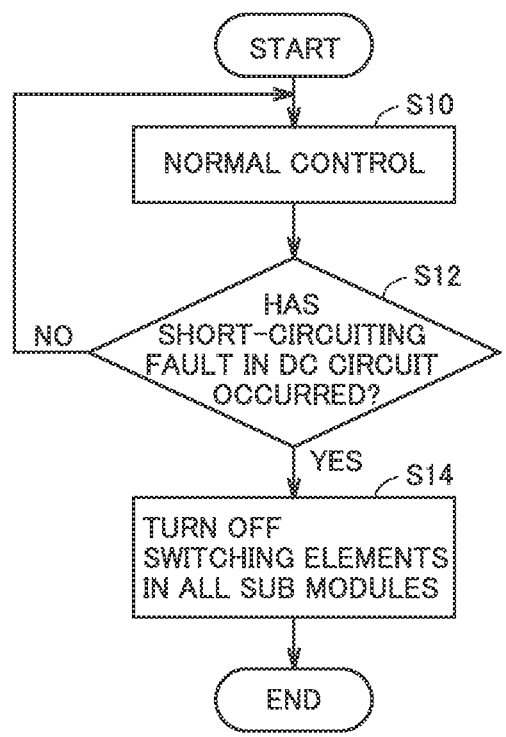
FIG. 6 is a flowchart showing a procedure of processing in a control device according to the first embodiment.

FIG. 6 is a flowchart showing a procedure of processing in control device 3 according to the first embodiment. Typically, an arithmetic processing unit of control device 3 performs each step below.

When initial charging (that is, initial charging of capacitors Chb and Csu) of power converter 2 is completed, control device 3 provides an operation start command and carries out normal control (step S10). Specifically, control device 3 controls an output voltage from each sub module 7 included in each leg circuit 4. In this case, in sub module 7SU, the output voltage is controlled by keeping switching element 22D always on and turning on and off switching elements 22A and 22B.

Then, control device 3 determines whether or not a short-circuiting fault in DC circuit 14 has occurred based on a current that flows in sub module 7 (step S12). For example, when at least one of absolute values of arm currents Ipu, Ipv, Ipw, Inu, Inv, and Inw detected by arm current detectors 9A and 9B exceeds a threshold value or when a total value of the arm currents of all phases exceeds the threshold value, control device 3 determines that the short-circuiting fault in DC circuit 14 has occurred. When a current detector is provided on a side of the positive terminal of DC circuit 14 in order to detect a current that flows in sub module 7, control device 3 may determine whether or not a short-circuiting fault has occurred based on a DC current detected by the current detector. For example, when the detected DC current exceeds a threshold value, control device 3 determines that the short-circuiting fault has occurred.

When the short-circuiting fault has not occurred (NO in step S12), control device 3 performs processing in step S10. When the short-circuiting fault has occurred (YES in step S12), control device 3 turns off switching elements (for example, switching elements 22A, 22B, and 22D) in all sub modules 7 included in each leg circuit 4 of power converter 2 (step S14). In this case, since each leg circuit 4 includes sub modules 7SU in number equal to or larger than calculated number K as described above, the short-circuiting current in DC circuit 14 is suppressed.

<Advantages>

According to the first embodiment, a capacitor for power conversion and a capacitor for suppression of the short-circuiting current are independently included. Therefore, since the capacitor suitable for power conversion and the capacitor suitable for suppression of the short-circuiting current can individually be designed, a fault current produced by the short-circuiting fault in the DC circuit can readily be suppressed. Consequently, break of an element within the sub module can be prevented.

Second Embodiment

In the first embodiment, the configuration for preventing break of an element within a sub module by suppressing the short-circuiting current that flows in each sub module 7 is described. In a second embodiment, a configuration for commutation of the short-circuiting current to a bypass circuit by using sub module 7SU will be described.

Figure 7:
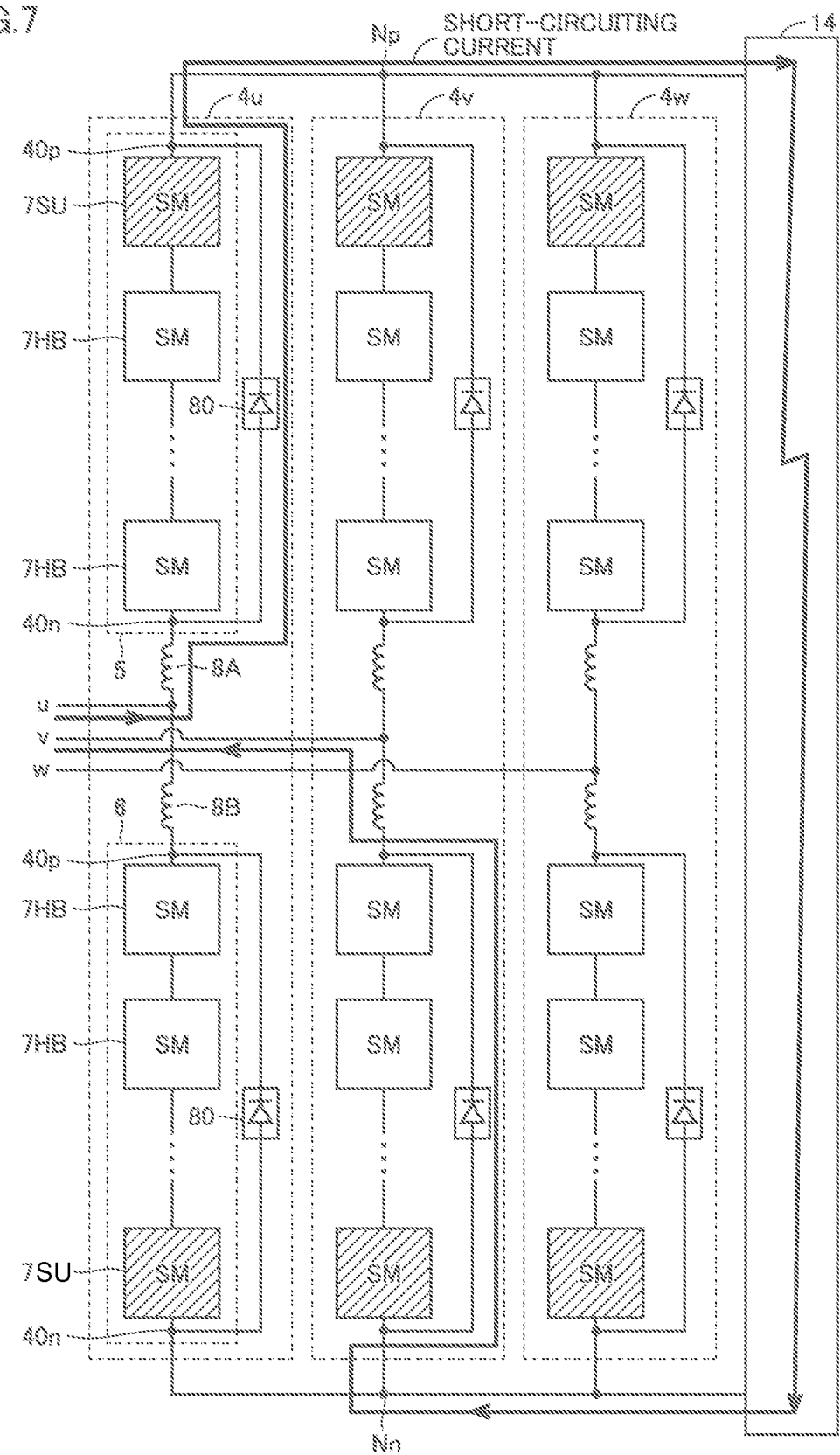
FIG. 7 is a diagram showing a configuration of the leg circuit according to a second embodiment.

FIG. 7 is a diagram showing a configuration of leg circuit 4 according to the second embodiment. Referring to FIG. 7, in each leg circuit 4, one of the plurality of sub modules 7 included in upper arm 5 is implemented by sub module 7SU, and sub modules 7 other than that are implemented by sub modules 7HB. Upper arm 5 is connected electrically in parallel to a bypass circuit 80 (that is, between external connection nodes 40p and 40n of upper arm 5). In lower arm 6 as well, one of the plurality of sub modules 7 is implemented by sub module 7SU and sub modules 7 other than that are implemented by sub modules 7HB. Lower arm 6 is connected electrically in parallel to bypass circuit 80.

Each bypass circuit 80 is provided for commutation of the short-circuiting current that flows through each arm in the event of the short-circuiting fault in DC circuit 14. Since the short-circuiting current flows in the direction from the low-potential-side terminal toward the high-potential-side terminal of each arm (that is, a direction from external connection node 40n on the low-potential side toward external connection node 40p on the high-potential side in each arm), bypass circuit 80 is configured to allow flow of a DC current in this direction.

During a normal operation of DC circuit 14, a DC voltage is applied such that the high-potential-side terminal is higher in potential than the low-potential-side terminal (that is, external connection node 40p in each arm is on the high-potential side and external connection node 40n is on the low-potential side). Therefore, each bypass circuit 80 is configured to block a current in the direction from the high-potential-side terminal toward the low-potential-side terminal. An operation of each arm during the normal operation of DC circuit 14 is thus prevented from being interfered. Typically, bypass circuit 80 includes at least one diode arranged such that a direction from negative DC terminal Nn toward positive DC terminal Np is a forward direction.

As described in the first embodiment, in the event of the short-circuiting fault in DC circuit 14, switching elements 22A, 22B, and 22D in each sub module 7 are turned off. Sub module 7SU includes capacitor Csu that generates a voltage for suppressing the short-circuiting current. Therefore, by implementing at least one of the plurality of sub modules 7 included in each arm with sub module 7SU, a voltage for suppressing the short-circuiting current is generated across opposing ends of the arm (that is, across external connection nodes 40p and 40n) in the event of the short-circuiting fault in DC circuit 14. Therefore, the short-circuiting current is commutated toward bypass circuit 80 without flowing through sub module 7 within the arm as shown in FIG. 7. Therefore, the short-circuiting current does not flow through each arm. Consequently, an element included in each sub module 7 is protected.

FIG. 8 is a circuit diagram showing an exemplary configuration of the bypass circuit according to the second embodiment. Referring to FIG. 8(a), bypass circuit 80 includes a plurality of diodes 82 connected in series to each other. Each diode 82 has a cathode provided on the high-potential side and an anode provided on the low-potential side. In other words, a direction from external connection node 40n on the low-potential side toward external connection node 40p on the high-potential side (that is, the direction from negative DC terminal Nn toward positive DC terminal Np) is the forward direction of each diode 82.

In the event of the short-circuiting fault in DC circuit 14, the short-circuiting current flows in the direction from external connection node 40n on the low-potential side toward external connection node 40p on the high-potential side, and hence the short-circuiting current can be caused to flow through a plurality of diodes 82 in each bypass circuit 80. Each sub module 7 is thus protected. Application of the DC voltage such that external connection node 40p is on the high-potential side and external connection node 40n is on the low-potential side during the normal operation of DC circuit 14 is reverse in direction with respect to each diode 82, and hence the current does not flow through bypass circuit 80.

When diodes 82 included in bypass circuit 80 are varied in characteristics, the applied voltage is allocated differently for each diode 82. Therefore, diode 82 to which a voltage higher than voltages to other diodes is applied may be broken by an overvoltage. In order to avoid this problem, an avalanche diode is desirably employed as each diode 82. In the avalanche diode, when a voltage equal to or higher than a defined level is applied across the anode and the cathode, a leakage current increases before break. Thus, increase in voltage in that diode can be suppressed and the voltage can be allocated to other diodes 82.

FIG. 8(b) shows a modification of FIG. 8(a). Bypass circuit 80 in FIG. 8(b) is different from bypass circuit 80 in FIG. 8(a) in including resistance elements 83 connected in parallel to respective diodes 82. Resistance elements 83 have resistance values substantially equal to one another. The resistance value of resistance element 83 is set to a relatively large value such that substantially no current flows through each resistance element 83 in the direction from external connection node 40p on the high-potential side toward external connection node 40n on the low-potential side during a normal operation of a power grid. By setting resistance elements 83 to substantially be equal to one another in resistance value, the voltage allocated for each diode 82 can substantially be equal and thus break of diode 82 can be prevented.

Though a configuration in which one bypass circuit 80 is connected in parallel to each arm is described in the example in FIG. 7 above, limitation to the configuration is not intended. A configuration in which bypass circuit 80 is connected in parallel to a certain number of sub modules 7 (which are also referred to as a "sub module group" below) within each arm may be applicable.

Figure 9:
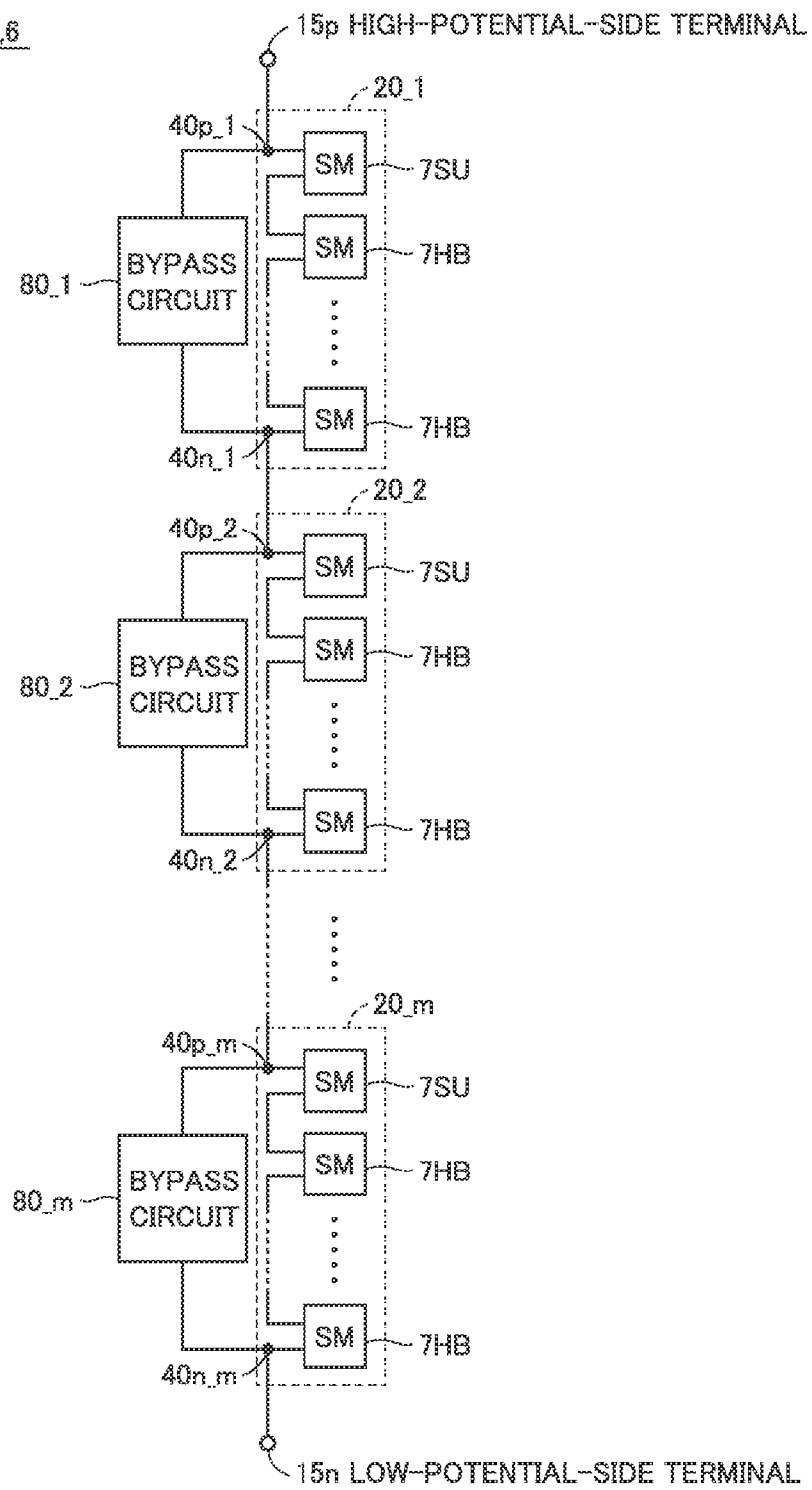
FIG. 9 is a diagram showing an exemplary configuration of a bypass circuit according to a modification of the second embodiment.

FIG. 9 is a diagram showing an exemplary configuration of a bypass circuit according to a modification of the second embodiment. FIG. 9 does not show reactors 8A and 8B connected to upper arm 5 and lower arm 6, respectively. In upper arm 5, a high-potential-side terminal 15p corresponds to positive DC terminal Np in FIG. 1 and a low-potential-side terminal 15n corresponds to AC terminal Nu, Nv, or Nw. In lower arm 6, high-potential-side terminal 15p corresponds to AC terminal Nu, Nv, or Nw in FIG. 1 and low-potential-side terminal 15n corresponds to negative DC terminal Nn.

Referring to FIG. 9, each arm includes m (m being an integer not smaller than one) cascade-connected sub module groups 20_1 to 20_m from sub module group 20_1 on the high-potential side to sub module group 20_m on the low-potential side. When sub module groups 20_1 to 20_m are collectively referred to, they are denoted as a sub module group 20. An example where a single sub module group 20 is included in each arm corresponds to the example in FIG. 7.

An ith sub module group 20_i (i being any integer that satisfies relation of 1≤i≤m) includes an external connection node 40p_i on the high-potential side and an external connection node 40n_i on the low-potential side for connection to another sub module group 20 and a plurality of sub modules 7 (7SU and 7HB) cascade-connected between external connection nodes 40p_i and 40n_i. When external connection nodes 40p_i and external connection nodes 40n_i are collectively referred to, they are denoted as an external connection node 40p and an external connection node 40n, respectively.

Each sub module group 20 includes at least one sub module 7SU and at least one sub module 7HB as sub modules 7. FIG. 9 shows an example in which each sub module group 20 is composed of a single sub module 7SU and a plurality of sub modules 7HB. The number of sub modules 7 included in each sub module group 20 may be different for each sub module group 20. An order of arrangement of sub module 7SU and sub module 7HB included in each sub module group 20 may be different for each sub module group 20.

Each arm further includes m bypass circuits 80_1 to 80_m (which are denoted as bypass circuit 80 when they are collectively referred to) corresponding to m respective sub module groups 20_1 to 20_m. m bypass circuits 80 include bypass circuit 80_1 on the high-potential side to bypass circuit 80_m on the low-potential side. Each bypass circuit 80 is connected electrically in parallel to corresponding sub module group 20 (that is, between external connection nodes 40p and 40n of corresponding sub module group 20).

In the event of the short-circuiting fault in DC circuit 14, switching elements 22A, 22B, and 22D in each sub module 7 are turned off. Sub module group 20 in FIG. 9 includes at least one sub module 7SU. Therefore, the short-circuiting current in the event of the short-circuiting fault in DC circuit 14 is commutated to bypass circuit 80 without flowing to sub module group 20. Consequently, an element included in each sub module 7 is protected.

<Advantages>

According to the second embodiment, the fault current produced by the short-circuiting fault in the DC circuit can be commutated to the bypass circuit. Consequently, break of a semiconductor element within the sub module can be prevented. The number of sub modules 7SU can generally be made smaller than in the exemplary configuration in the first embodiment.

Other Embodiments (1) In the embodiments described above, a circuit corresponding to sub module 7SU may be provided by combining sub module 7HB and semiconductor circuit 32.

Figure 10:
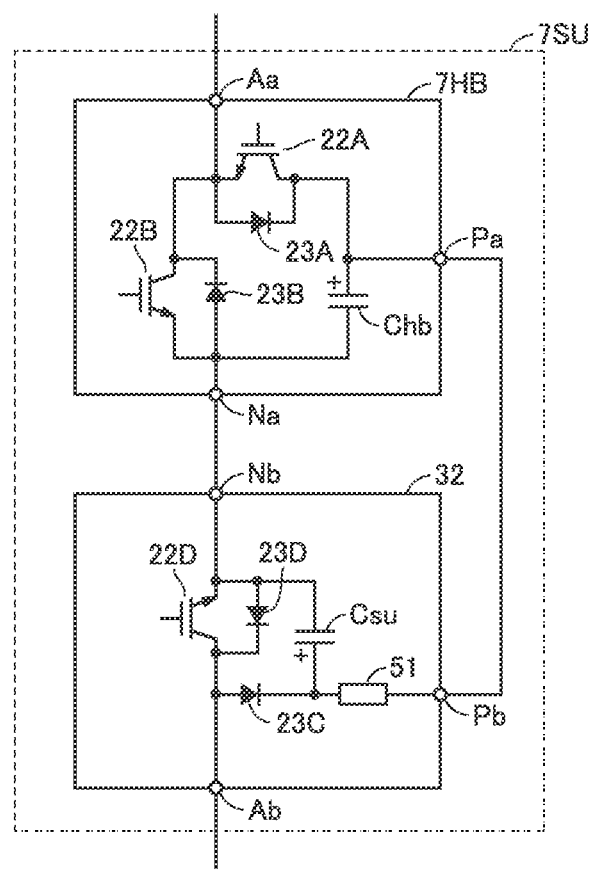
FIG. 10 is a diagram showing an exemplary circuit configuration (No. 1) of a sub module according to another embodiment.

FIG. 10 is a diagram showing an exemplary circuit configuration (No. 1) of sub module 7 according to another embodiment. Referring to FIG. 10, semiconductor circuit 32 is connected to sub module 7HB. Specifically, a positive terminal Pa of sub module 7HB is connected to a positive terminal Pb of semiconductor circuit 32, and a negative terminal Na of sub module 7HB is connected to a negative terminal Nb of semiconductor circuit 32. A terminal Aa of sub module 7HB corresponds to input/output terminal 26P on the high-potential side of sub module 7SU in FIG. 2 and a terminal Ab of semiconductor circuit 32 corresponds to input/output terminal 26N on the low-potential side of sub module 7SU in FIG. 2. Sub module 7SU can be implemented by thus combining sub module 7HB and semiconductor circuit 32 with each other. In this case, sub module 7SU can be implemented simply by additionally connecting semiconductor circuit 32 to existing sub module 7HB.

Figure 11:
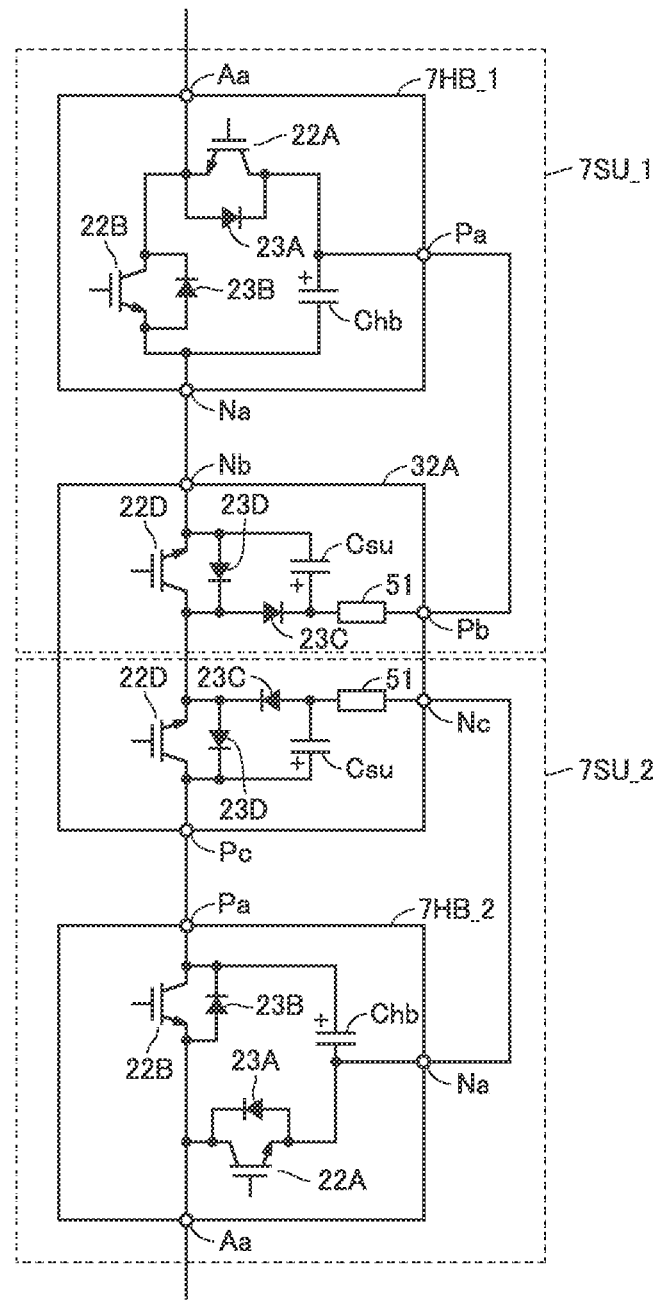
FIG. 11 is a diagram showing an exemplary circuit configuration (No. 2) of a sub module according to another embodiment.

FIG. 11 is a diagram showing an exemplary circuit configuration (No. 2) of sub module 7 according to another embodiment. Referring to FIG. 11, two sub modules 7HB_1 and 7HB_2 in the half-bridge configuration are connected to a single semiconductor module 32A. Semiconductor module 32A is implemented by combining two semiconductor circuits 32.

Specifically, positive terminal Pa of sub module 7HB_1 is connected to positive terminal Pb of semiconductor module 32A and negative terminal Na of sub module 7HB_1 is connected to negative terminal Nb of semiconductor module 32A. Positive terminal Pa of sub module 7HB_2 is connected to a positive terminal Pc of semiconductor module 32A and negative terminal Na of sub module 7HB_2 is connected to a negative terminal Nc of semiconductor module 32A.

In the exemplary configuration in FIG. 11, a circuit constituted of sub module 7HB_1 and upper semiconductor circuit 32 in semiconductor module 32A corresponds to a circuit in sub module 7SU (corresponding to a sub module 7SU_1 in the figure). A circuit constituted of sub module 7HB_2 and a lower semiconductor circuit 32 in semiconductor module 32A corresponds to a circuit in sub module 7SU (corresponding to a sub module 7SU_2 in the figure). Terminal Aa of sub module 7HB_1 corresponds to the input/output terminal on the high-potential side and terminal Aa of sub module 7HB_2 corresponds to the input/output terminal on the low-potential side.

By selecting a capacitor low in capacity as capacitor Csu, a volume of semiconductor circuit 32 can be made smaller.

In this case, by making use of such an advantage as a smaller volume of semiconductor circuit 32 than sub module 7HB as in the exemplary configuration in FIG. 11, two semiconductor circuits 32 can be accommodated in a single module (that is, semiconductor module 32A).

Figure 12:
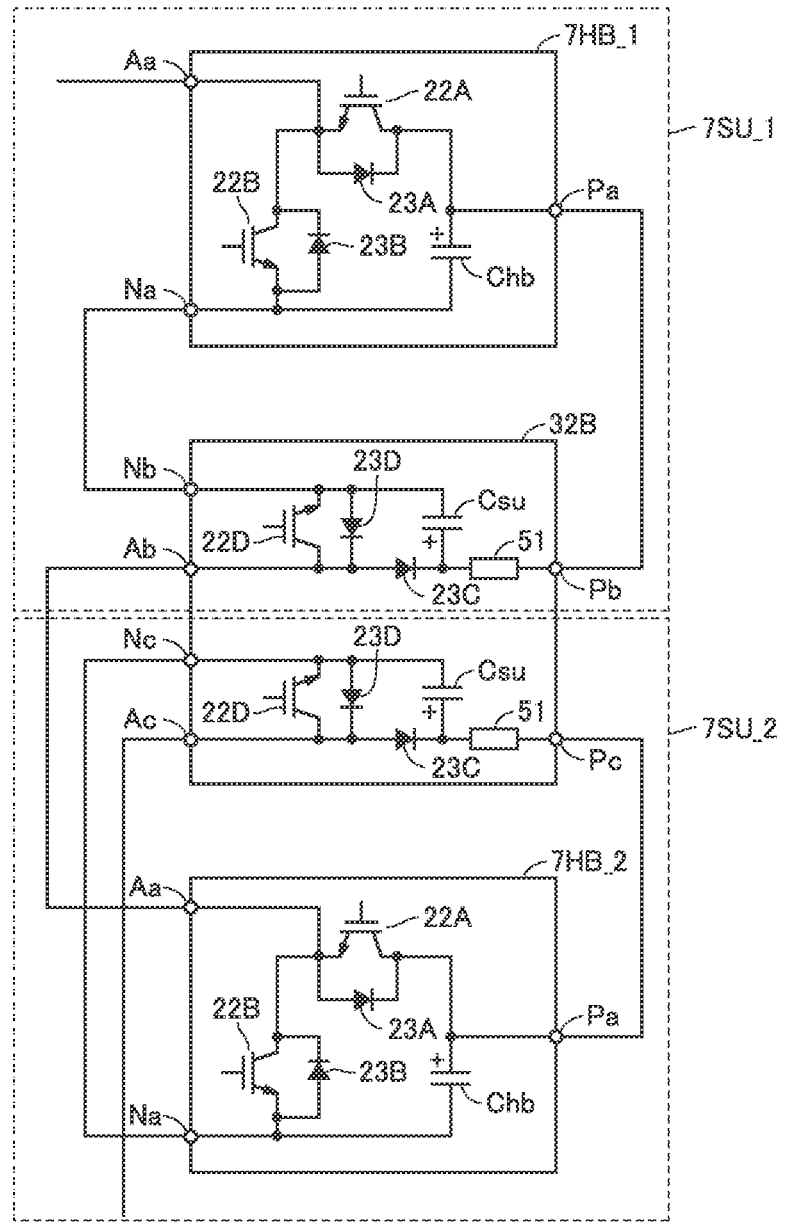
FIG. 12 is a diagram showing an exemplary circuit configuration (No. 3) of a sub module according to another embodiment.

FIG. 12 is a diagram showing an exemplary circuit configuration (No. 3) of sub module 7 according to another embodiment. An exemplary configuration in FIG. 12 is basically similar to the exemplary configuration in FIG. 11, and upper sub module 7HB_1 is identical in circuit configuration to lower sub module 7HB_2. Two sub modules 7HB_1 and 7HB_2 in the half-bridge configuration are connected to a single semiconductor module 32B. Semiconductor module 32B is implemented by combining two semiconductor circuits 32.

In the exemplary configuration in FIG. 12, a circuit constituted of sub module 7HB_1 and upper semiconductor circuit 32 in semiconductor module 32B corresponds to a circuit in sub module 7SU (corresponding to sub module 7SU_1 in the figure). A circuit constituted of sub module 7HB_2 and lower semiconductor circuit 32 in semiconductor module 32B corresponds to a circuit in sub module 7SU (corresponding to sub module 7SU_2 in the figure). Terminal Aa of sub module 7HB_1 corresponds to the input/output terminal on the high-potential side and a terminal Ac of semiconductor module 32B corresponds to the input/output terminal on the low-potential side.

(2) Though an example in which sub module 7 for suppression of a short-circuiting current is in a circuit configuration as in FIG. 2(b) is described in the embodiments above, without being limited to such a circuit configuration, for example, a circuit configuration as shown in FIG. 13 may be applicable.

FIG. 13 is a diagram showing another exemplary circuit configuration of a sub module with a function to suppress a short-circuiting fault current. "Sub module 7" in the circuit configuration shown in FIG. 13 is also referred to as a "sub module 7SUx."

Referring to FIG. 13(a), sub module 7SUx performs a function to suppress a short-circuiting current in the event of a short-circuiting fault in DC circuit 14, similarly to sub module 7SU shown in FIG. 2(b). Specifically, sub module 7SUx includes a semiconductor circuit 31x, capacitor Chb, and a semiconductor circuit 32x. Semiconductor circuit 31x, capacitor Chb, and semiconductor circuit 32x are connected in parallel to one another.

Semiconductor circuit 31x includes two switching elements 22A and 22B connected in series and diodes 23A and 23B. Diodes 23A and 23B are connected in anti-parallel to respective switching elements 22A and 22B.

Semiconductor circuit 32x includes a series circuit 41x, capacitor Csu, and resistance element 51. Series circuit 41x includes switching element 22D and diode 23C connected in series, diode 23C being a semiconductor element through which the short-circuiting current flows. Capacitor Csu is an energy accumulation element connected in parallel to series circuit 41x. Resistance element 51 is connected in series to a parallel circuit 45x including series circuit 41x and capacitor Csu. Diode 23D is a diode connected in anti-parallel to switching element 22D. Semiconductor circuit 32x performs a function to suppress a fault current that flows on the occurrence of a short-circuiting fault in DC circuit 14, similarly to semiconductor circuit 32 in FIG. 2(b).

The node of connection between switching elements 22A and 22B is connected to input/output terminal 26N on the low-potential side and the node of connection between switching element 22D and diode 23C is connected to input/output terminal 26P on the high-potential side. During a normal power conversion operation, switching element 22D is always on. In this case, when switching element 22A is turned on and switching element 22B is turned off, a voltage across ends of capacitor Chb is provided, and when switching element 22A is turned off and switching element 22B is turned on, the zero voltage is provided.

FIG. 13(b) shows a path of the short-circuiting current within sub module 7SUx. It is assumed that voltage Vhb of capacitor Chb is substantially equal to voltage Vsu of capacitor Csu. For example, when control device 3 determines that the short-circuiting fault has occurred in DC circuit 14 based on detected arm current Iarm, it turns off switching elements 22A, 22B, and 22D. Thus, as shown in FIG. 13(b), the short-circuiting current flows through the path from input/output terminal 26N through diode 23B, capacitor Csu, and diode 23C to input/output terminal 26P.

The function to suppress the short-circuiting current of sub module 7SUx is similar to that of sub module 7SU. Specifically, when a voltage across input/output terminals 26P and 26N is equal to or lower than voltage Vsu, the short-circuiting current can be suppressed. Since input/output terminals 26P and 26N are connected in series, generally, the short-circuiting current can be suppressed so long as the voltage (for example, an AC grid voltage) of AC circuit 12 is equal to or lower than the total of voltages Vsu of capacitors Csu present on the path of the short-circuiting current.

(3) The configuration exemplified in the embodiments described above represents an exemplary configuration in the present disclosure, and it can be combined with another known technique or may be modified, for example, partially be omitted, within the scope not departing from the gist of the present disclosure. In the embodiments described above, the processing and the configuration described in other embodiments may be adopted and carried out as appropriate.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST 1 power conversion device; 2 power converter; 3 control device; 4u, 4v, 4w leg circuit; 5 upper arm; 6 lower arm; 7, 7HB, 7SU, 7SUx sub module; 8A, 8B reactor; 9A, 9B arm current detector; 10 AC voltage detector; 11A, 11B DC voltage detector; 12 AC circuit; 13 transformer; 14 DC circuit; 15n low-potential-side terminal; 15p high-potential-side terminal; 16 AC current detector; 20 sub module group; 22A, 22B, 22D switching element; 23A, 23B, 23C, 23D, 82 diode; 26N, 26P input/output terminal; 31, 31x, 32, 32x, 35 semiconductor circuit; 32A, 32B semiconductor module; 40n, 40p external connection node; 41, 41x series circuit; 45, 45x parallel circuit; 51, 83 resistance element; 80 bypass circuit; Nn negative DC terminal; Np positive DC terminal; Nu, Nv, Nw AC terminal

The invention claimed is:

1. A power conversion device that converts electric power between a DC circuit and an AC circuit, the power conversion device comprising:

a leg circuit including a plurality of sub modules connected in series, wherein at least one of the plurality of sub modules is a first sub module, the first sub module includes a first energy accumulation element for power conversion, a first semiconductor circuit including two switching elements connected in series, and a second semiconductor circuit, the first energy accumulation element, the first semiconductor circuit, and the second semiconductor circuit are connected in parallel to one another, and the second semiconductor circuit includes
- a series circuit including a switching element and a semiconductor element connected in series,
- a second energy accumulation element for suppression of short-circuit current, the second energy accumulation element connected in parallel to the series circuit, and
- an element including a resistive component connected in series to a parallel circuit including the series circuit and the second energy accumulation element, the power conversion device further includes:
- a current detector that detects a current that flows through the plurality of sub modules; and
- a control device that controls each of the plurality of sub modules, wherein
- the control device determines whether a short-circuiting fault in the DC circuit has occurred based on the current detected by the current detector, and
- when the short-circuiting fault in the DC circuit occurs, the control device turns off all switching elements included in the plurality of sub modules in the leg circuit.

2. The power conversion device according to claim 1, wherein the semiconductor element is a diode.

3. The power conversion device according to claim 2, wherein
the element including the resistive component is a resistance element, a diode, or a reactor.

4. The power conversion device according to claim 2, wherein
the number of first sub modules is larger than a number calculated by dividing a maximum value of a voltage of the AC circuit by a voltage of the second energy accumulation element.

5. The power conversion device according to claim 2, wherein
a second sub module other than the first sub module among the plurality of sub modules is in a half-bridge configuration in which an energy accumulation element and a semiconductor circuit including two switching elements connected in series are connected in parallel.

6. The power conversion device according to claim 2, wherein
the leg circuit includes a first arm provided between an AC connector connected to the AC circuit and a positive DC terminal connected to the DC circuit and a second arm provided between the AC connector and a negative DC terminal connected to the DC circuit,
each of the first arm and the second arm includes at least one sub module group,
each of the at least one sub module group is connected in parallel to a bypass circuit,
each of the at least one sub module group includes at least one first sub module and at least one second sub module, and
the second sub module is in a half-bridge configuration in which an energy accumulation element and a semiconductor circuit including two semiconductor switching elements connected in series are connected in parallel.

7. The power conversion device according to claim 1, wherein
the element including the resistive component is a resistance element, a diode, or a reactor.

8. The power conversion device according to claim 7, wherein
the number of first sub modules is larger than a number calculated by dividing a maximum value of a voltage of the AC circuit by a voltage of the second energy accumulation element.

9. The power conversion device according to claim 7, wherein
a second sub module other than the first sub module among the plurality of sub modules is in a half-bridge configuration in which an energy accumulation element and a semiconductor circuit including two switching elements connected in series are connected in parallel.

10. The power conversion device according to claim 7, wherein
the leg circuit includes a first arm provided between an AC connector connected to the AC circuit and a positive DC terminal connected to the DC circuit and a second arm provided between the AC connector and a negative DC terminal connected to the DC circuit,
each of the first arm and the second arm includes at least one sub module group,
each of the at least one sub module group is connected in parallel to a bypass circuit,
each of the at least one sub module group includes at least one first sub module and at least one second sub module, and
the second sub module is in a half-bridge configuration in which an energy accumulation element and a semiconductor circuit including two semiconductor switching elements connected in series are connected in parallel.

11. The power conversion device according to claim 1, wherein
the number of first sub modules is larger than a number calculated by dividing a maximum value of a voltage of the AC circuit by a voltage of the second energy accumulation element.

12. The power conversion device according to claim 11, wherein
a second sub module other than the first sub module among the plurality of sub modules is in a half-bridge configuration in which an energy accumulation element and a semiconductor circuit including two switching elements connected in series are connected in parallel.

13. The power conversion device according to claim 11, wherein
the leg circuit includes a first arm provided between an AC connector connected to the AC circuit and a positive DC terminal connected to the DC circuit and a second arm provided between the AC connector and a negative DC terminal connected to the DC circuit,
each of the first arm and the second arm includes at least one sub module group,
each of the at least one sub module group is connected in parallel to a bypass circuit,
each of the at least one sub module group includes at least one first sub module and at least one second sub module, and
the second sub module is in a half-bridge configuration in which an energy accumulation element and a semiconductor circuit including two semiconductor switching elements connected in series are connected in parallel.

14. The power conversion device according to claim 1, wherein a second sub module other than the first sub module among the plurality of sub modules is in a half-bridge configuration in which an energy accumulation element and a semiconductor circuit including two switching elements connected in series are connected in parallel.

15. The power conversion device according to claim 1, wherein the leg circuit includes a first arm provided between an AC connector connected to the AC circuit and a positive DC terminal connected to the DC circuit and a second arm provided between the AC connector and a negative DC terminal connected to the DC circuit, each of the first arm and the second arm includes at least one sub module group, each of the at least one sub module group is connected in parallel to a bypass circuit, each of the at least one sub module group includes at least one first sub module and at least one second sub module, and the second sub module is in a half-bridge configuration in which an energy accumulation element and a semiconductor circuit including two semiconductor switching elements connected in series are connected in parallel.

16. The power conversion device according to claim 15, wherein the bypass circuit includes at least one diode arranged such that a direction from the negative DC terminal toward the positive DC terminal is a forward direction.

* * * * *